(12) United States Patent
Clarke

(10) Patent No.: US 7,582,385 B2
(45) Date of Patent: Sep. 1, 2009

(54) ZINC AIR BATTERY WITH ACID ELECTROLYTE

(75) Inventor: Robert Lewis Clarke, Orinda, CA (US)

(73) Assignee: Applied Intellectual Capital Limited, St. Helier, NJ (US)

( * ) Notice: Subject to any disclaimer, the term of this patent is extended or adjusted under 35 U.S.C. 154(b) by 736 days.

(21) Appl. No.: 10/518,041

(22) PCT Filed: Jun. 25, 2002

(86) PCT No.: PCT/US02/20522

§ 371 (c)(1),
(2), (4) Date: Dec. 15, 2004

(87) PCT Pub. No.: WO04/001879

PCT Pub. Date: Dec. 31, 2003

(65) Prior Publication Data

US 2005/0208386 A1 Sep. 22, 2005

(51) Int. Cl.
  H01M 6/04 (2006.01)
  H01M 4/60 (2006.01)
  H01M 4/42 (2006.01)
  H01M 6/18 (2006.01)
(52) U.S. Cl. .................. 429/229; 429/212; 429/213; 429/188; 429/306
(58) Field of Classification Search .................. 429/15, 429/29, 229, 41, 212, 213; 204/55, 44.2
See application file for complete search history.

(56) References Cited

U.S. PATENT DOCUMENTS

| 3,440,098 | A | | 4/1969 | Stachurski |
| 3,540,935 | A | | 11/1970 | Keating et al. |
| 3,560,261 | A | | 2/1971 | Stachurski et al. |
| 3,650,837 | A | * | 3/1972 | Palmer ............... 429/21 |
| 3,716,413 | A | | 2/1973 | Eisner |
| 3,822,149 | A | | 7/1974 | Hale et al. |
| 3,825,445 | A | | 7/1974 | MacKarthy |
| 3,944,430 | A | | 3/1976 | Lee |
| 4,066,823 | A | * | 1/1978 | Armstrong ............ 429/41 |
| 4,220,690 | A | * | 9/1980 | Blurton et al. ........... 429/15 |
| 4,226,682 | A | * | 10/1980 | Popescu ................ 205/314 |
| 4,772,362 | A | | 9/1988 | Martin et al. |
| 5,281,496 | A | | 1/1994 | Clarke |
| 6,428,928 | B1 | * | 8/2002 | Harada et al. ........... 429/212 |
| 7,214,443 | B2 | * | 5/2007 | Clarke et al. ........... 429/101 |
| 2003/0162087 | A1 | * | 8/2003 | Clarke et al. ........... 429/105 |

FOREIGN PATENT DOCUMENTS

| EP | 644275 A1 | * | 3/1995 |
| JP | 57101359 A | * | 6/1982 |
| WO | 02004713 | | 1/2002 |
| WO | 03028127 | | 4/2003 |

* cited by examiner

Primary Examiner—Dah-Wei D Yuan
Assistant Examiner—Zachary Best
(74) Attorney, Agent, or Firm—Fish & Associates, PC

(57) ABSTRACT

A zinc air battery, and preferably a secondary zinc air battery has an acid electrolyte in which the anionic form of an acid forms a complex with a zinc ion, and wherein the acid in the electrolyte reduces dendrite formation.

10 Claims, 1 Drawing Sheet

ZINC AIR BATTERY WITH ACID ELECTROLYTE

FIELD OF THE INVENTION

The field of the invention generally pertains to batteries and other types of power cells.

BACKGROUND OF THE INVENTION

Many types of batteries and other power cells are known, based upon a relatively wide range of electrical couples. Among the most popular electrical couples are those containing zinc. Zinc is regarded as the highest energy couple component that can be cycled in an aqueous room temperature battery and is therefore commonly used in numerous battery and power cell applications.

For example, zinc is coupled with carbon in most simple flashlight batteries to provide a relatively inexpensive and reliable power source. Although manufacture of Zn/C batteries is generally simple and poses only relatively little environmental impact, various disadvantages of Zn/C batteries exist. Among other things, the ratio of power to weight in commonly used Zn/C batteries is relatively poor. To improve the ratio of power to weight, alternative coupling partners and systems can be employed. For example, zinc can be coupled with mercury oxide or silver to achieve an improved power to weight ratio. However, the toxicity of mercury oxide is frequently problematic in manufacture and tends to become even more problematic when such batteries are discarded. On the other hand, while silver as a coupling partner for zinc is environmentally substantially neutral and significantly improves the power to weight ratio, the use of silver is in many instances economically prohibitive.

Furthermore, halogens may be employed as a coupling partner for zinc, and most common zinc-halogen couples include zinc-bromine and zinc-chloride (e.g., for load leveling batteries). However, such battery configurations are often difficult to integrate into portable or miniaturized devices. Moreover, such battery configurations typically require pumping systems and are often prone to leakage leading to significant problems due to the highly corrosive nature of halogens.

Alternatively, oxygen may be employed in primary batteries as a gaseous redox partner for zinc, thereby generally avoiding problems associated with toxicity, excessive cost for redox partners, or spillage. Among various advantages in such configurations, using air (i.e., oxygen) as redox partner for zinc typically results in a relatively high power to weight ratio. Moreover, the zinc-oxygen system generally provides a relatively flat discharge curve. However, reasonable shelf life of such primary batteries can often only be achieved by using an airtight seal, and commercial applications of zinc-air batteries have previously been limited to primary or non-rechargeable types.

In order to further take advantage of the relatively high power-to-weight ratio in zinc air batteries, secondary zinc air batteries have been developed. However, among various other difficulties, electrodeposition of metallic zinc during charging frequently resulted in dendrite formation, thereby changing the zinc electrode shape and consequently decreasing the battery capacity. To reduce at least some of the problems associated with dendrite growth in alkaline electrolyte, various compositions, configurations, and methods have been developed. For example, mechanical movement of the anode to prevent or reduce dendrite growth is described in U.S. Pat. No. 3,716,413 to Eisner, U.S. Pat. No. 3,560,261 to Stachurski et al, or in U.S. Pat. No. 3,440,098 to Stachurski.

Alternatively, complexing agents may be added to the electrolyte to increase solubility of the zinc in the alkaline electrolyte and to thereby improve the quality of the plating as described in U.S. Pat. No. 3,540,935 to Keating et al. In yet another approach to reduce or inhibit dendrite formation on the zinc anode, the anode surface may be mechanically abraded while the alkaline electrolyte is vigorously moved within the battery as described in U.S. Pat. No. 3,822,149 to Hale et al.

However, despite at least some reduction in dendrite formation using the above compositions, configurations, and methods, additional difficulties nevertheless remain. Among other things, the use of alkaline electrolytes frequently leads to absorption of carbon dioxide from the air and other sources, which will consequently form carbonates in the electrolyte, which in turn tend to reduce conductivity and clog the pores in the active surfaces of the electrodes.

To avoid at least some of the problems associated with the used of alkaline electrolytes in zinc air batteries, acidic aqueous electrolytes may be employed. For example, acid electrolytes have been used in primary or non-reversible electrochemical cells as described in U.S. Pat. No. 3,825,445 to MacKarthy. Where rechargeable zinc air batteries are desired, dendrite formation may be reduced to at least some extent using a zinc-containing electrolyte comprising an aqueous acid and containing a quaternary ammonium compound for suppression of formation of dendrites on the anode during charging as described in U.S. Pat. No. 3,944,430. However, quaternary ammonium compounds may adversely affect longevity of the battery and may further be oxidized over time. Moreover, the relatively limited solubility of zinc ions in such electrolytes may further reduce the capacity of the battery.

Alternatively, the electrolyte in zinc air batteries may be vigorously circulated to avoid or at least reduce dendrite formation as described in U.S. Pat. No. 4,220,690 to Blurton et al. While Blurton's configuration reduces dendrite formation to at least some extent, continuous pumping of the electrolyte is typically required. Furthermore, Blurton's configuration typically requires separate catholyte and anolyte reservoirs, thereby rendering the battery more space consuming and increasing the weight of such battery systems.

In yet further alternative approaches, zinc air batteries may be mechanically recharged by replacing the depleted zinc anode and zinc enriched electrolyte with an externally regenerated zinc anode and acid electrolyte (e.g., Creation of a zinc/air-battery-system-infrastructure for the European union (ZABEU) EU Project TR/00013/94). Mechanically recharging zinc air battery systems generally avoids dendrite formation within the battery, however, requires availability of spare anodes and electrolyte at the point of recharge, which may pose a significant logistic problem for everyday use of secondary rechargeable zinc air batteries.

Thus, although there are numerous coupling partners for zinc in batteries and power cells known in the art, all or almost all of them suffer from one or more disadvantage. Therefore, there is still a need to provide compositions and methods for improved batteries.

SUMMARY OF THE INVENTION

The present invention is generally directed to primary and secondary batteries having an acid electrolyte, in which a dendrite-forming metal and oxygen form a redox pair, wherein the battery can be operated over numerous cycles without significant dendrite formation.

In one aspect of the inventive subject matter, acidity of the electrolyte in particularly preferred batteries is provided at least in part by a compound that reduces dendrite formation. In further especially preferred batteries, the dendrite-forming metal is zinc, and the compound comprises an organic acid comprises an organic acid, most preferably methane sulfonic acid, polyvinyl sulfonic acid, polyvinyl sulfuric acid, or sulfurous acid. A further particular advantage of contemplated batteries is the lack of significant absorption of carbon dioxide from the battery environment or from within the battery.

In another aspect of the inventive subject matter, contemplated batteries may further include a zinc brightener, and preferred brighteners include aromatic monocarboxylic acids, aromatic aldehydes, and polyhydric alcohols having ethoxylated or propoxylated hydroxyl groups. The dendrite-forming metal in preferred batteries may form a complex with the compound when the battery discharges.

In further contemplated aspects, oxygen is reduced on the cathode when the battery is charged, wherein the cathode may comprise Magnelli phase titanium suboxide and/or glassy carbon. Furthermore especially preferred configurations of contemplated batteries may also include a plurality of cells in which a bipolar electrode separates a first cell from a second cell, and in which at least one side of the bipolar electrode comprises a Magnelli phase titanium suboxide.

Therefore, especially suitable batteries will include an acid electrolyte in which zinc and oxygen form a redox pair, and wherein the electrolyte further comprises methane sulfonic acid in an amount effective to reduce dendrite formation. Thus, it should be appreciated that particularly contemplated secondary batteries may have a static catholyte and a static acidic anolyte, wherein at least one of the catholyte and the anolyte includes a dendrite-reducing acid thereby allowing use of the battery through at least 50 cycles at substantially unchanged battery performance.

Various objects, features, aspects, and advantages of the present invention will become more apparent from the following detailed description of preferred embodiments of the invention, along with the accompanying drawing.

DETAILED DESCRIPTION

Figure 1:
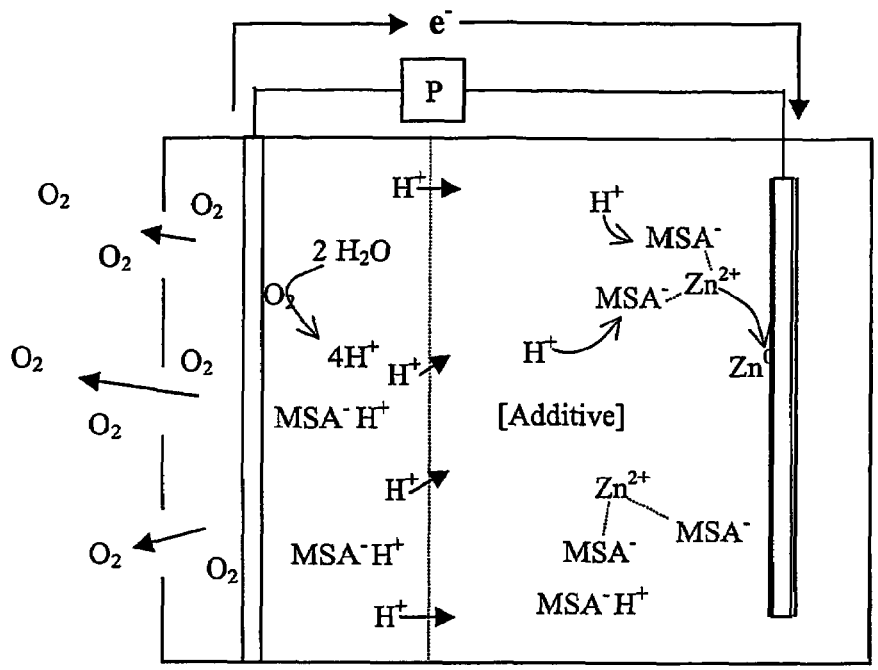
FIG. 1 is a schematic view of an exemplary battery during charging.

The inventors have surprisingly discovered that zinc air batteries that include an acidic electrolyte may be operated over numerous charge/discharge cycles without substantial change in battery performance when the electrolyte comprises a compound that reduces dendrite formation.

As used herein, the term "acid electrolyte" refers to an aqueous or non-aqueous fluid in which the pH is less than 7.0, and in which $Zn^{2+}$ ions are disposed (e.g., dissolved or in a complex that is dissolved). As also used herein, the term "static catholyte" means that the catholyte is enclosed in the cathode compartment without agitation by an agitator, wherein the term "agitator" refers to a pump or other fluid propeller that directly or indirectly circulates the catholyte in the cathode compartment. However, the term static catholyte expressly includes a catholyte that moves in the cathode compartment due to thermal effects and/or movement of the battery comprising the cathode compartment. Similarly, the term "static anolyte" means that the anolyte is enclosed in the anode compartment without agitation by an agitator. However, the term static anolyte expressly includes an anolyte that moves in the anode compartment due to thermal effects and/or movement of the battery comprising the anode compartment. Furthermore, the term "battery" as used herein includes an assembly of electrochemical cells as well as a single electrochemical cell.

As further used herein, the term "dendrite-forming metal" refers to any metal or metal containing compound that electrolytically deposits on an electrode surface and forms a dendrite under dendrite-forming conditions (e.g., charging of a battery). Therefore, particularly contemplated dendrite-forming metals include zinc and lithium.

As still further used herein, the term "compound reduces dendrite formation" means that the presence of the compound in the electrolyte of the battery reduces the number of dendrites on an electrode and/or reduces the extent to which a dendrite grows towards the electrode of opposite polarity during charging of the battery as compared to identical charging conditions of the same battery without the compound in the electrolyte. Similarly, the term "dendrite-reducing acid" refers to an acid that reduces dendrite formation. Reduction of dendrite formation may be ascertained by visual inspection of number and size/height of the dendrites. Furthermore, reduction of dendrite formation may be ascertained by non-occurrence of internal short circuits precipitated by dendrites piercing at least one separator.

As also used herein, the term "use of the battery through at least X cycles" means that the battery is charged and discharged X times over at least 20% of the battery capacity, and as further used herein, the term "substantially unchanged battery performance" means that the capacity of the battery changes less than 20%, more typically less than 10%, and most typically less than 5%.

As further used herein, the term "redox pair" is interchangeably used with the term "redox couple" and refers to a combination of a first element (or ion of the first element) and second element (or ion of the second element) in a battery, in which reduction of the first element and oxidation of the second element produce the current provided by the battery, wherein first and second elements may be in ionic form as well as in non-ionic form.

As still further used herein, the term "anode" refers to the negative electrode of a battery (i.e., the electrode where oxidation occurs) during discharge of the battery. Thus, the term "anode compartment" refers to the battery compartment that includes the anode, and the term "anolyte" refers to the electrolyte in the anode compartment. Similarly, the term "cathode" refers to the positive electrode of a battery (i.e., the electrode where reduction occurs) during discharge of the battery. Thus, the term "cathode compartment" refers to the battery compartment that includes the cathode, and the term "catholyte" refers to the electrolyte in the cathode compartment.

In a particularly preferred aspect, an exemplary zinc air battery is depicted in FIG. 1 during charging. Here, the battery 100 includes a cell 110 that is divided by separator 120 into an anode compartment 130 and a cathode compartment 140. Both anode and cathode compartments include an aqueous solution of methane sulfonic acid 150 as acid electrolyte, wherein at least some of the anions of the methane sulfonic acid ($MSA^-$) complex the ionic forms of zinc (here: $Zn^{2+}$) and wherein at least some of the anions of the methane sulfonic acid ($MSA^-$) receive the $H^+$ that are generated from the oxidation of the oxygen in the water in the catholyte. The anode compartment 130 further comprises anode 132 that is at least partially covered by non-ionic plated metallic zinc ($Zn^0$) 134.

The cathode compartment 140 comprises cathode 142. Anode 132 and cathode 142 are electrically coupled to the power source 160, and the arrow above the power source indicates the flow of the electrons from the anode to the cathode during charge.

Figure 2:
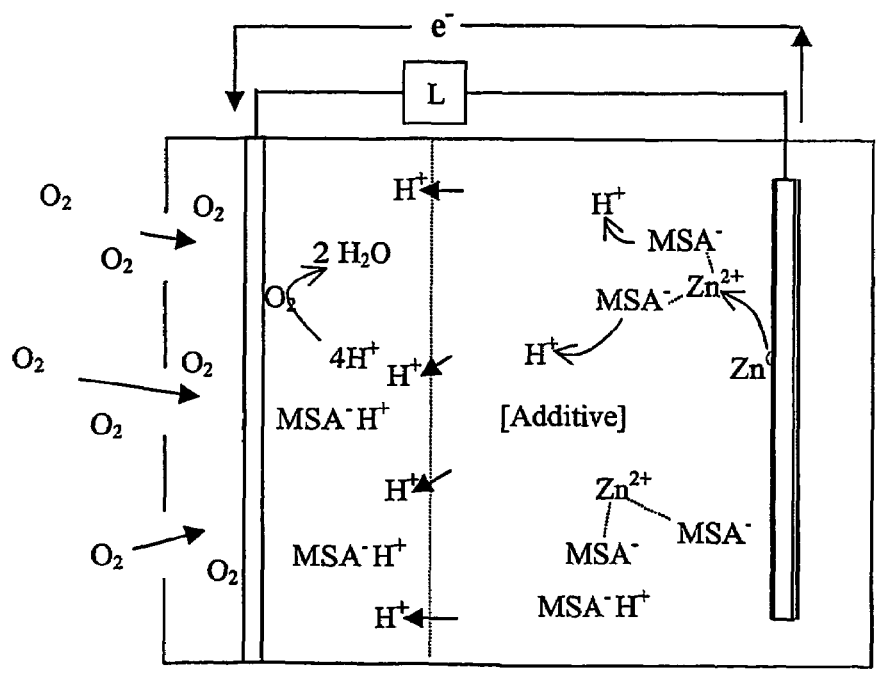
FIG. 2 is a schematic view of an exemplary battery during discharge.

Similarly, FIG. 2 depicts an exemplary battery during discharge. Here, the battery 200 includes a cell 210 that is at least partially divided by separator 220 into an anode compartment 230 and a cathode compartment 240. Both anode and cathode compartments include an aqueous solution of methane sulfonic acid 250 as acid electrolyte, wherein at least some of the anions of the acid (MSA⁻) complex the ionic forms of zinc (here: $Zn^{2+}$) and wherein at least some of the protonated forms of MSA donate a H⁺ to the electrolyte. The anode compartment 230 further comprises anode 232 that is at least partially covered by non-ionic plated metallic zinc (Zn⁰) 234. The cathode compartment 240 comprises cathode 242. Anode 232 and cathode 242 are electrically coupled to the load 260, and the arrow above the power source indicates the flow of the electrons during charging of the battery.

Thus, the inventors contemplate that zinc will be dissolved into the electrolyte upon discharge of the battery, and plated onto one electrode during charging while oxygen will donate/receive electrons on the other electrode following the equations (I) and (II) below.

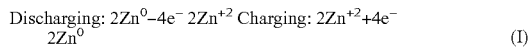

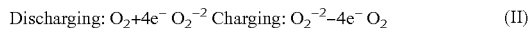

Consequently, in an exemplary Zn/O redox system using aqueous methane sulfonic acid as one component in the electrolyte, it is contemplated that the following reactions occur during charging (The reactions are reversed on discharge):

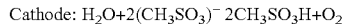

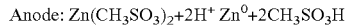

Therefore, it should be recognized that the dendrite-forming metal forms a complex with the compound when the battery discharges. With respect to the dendrite forming metal, it is generally preferred that zinc is the redox partner for oxygen. However, it should be appreciated that numerous alternative elements are also suitable for use in conjunction with the teachings presented herein, and particularly preferred alternative elements include lithium. Further suitable elements metals are those that provide an open cell voltage of at least 0.1V under acidic conditions in combination with oxygen. In further preferred aspects of contemplated batteries, and especially where the dendrite forming metal is zinc, the concentration of dendrite forming metal ions in the electrolyte is at least 0.05 M, preferably at least 0.1 M, more preferably at least 0.3 M, even more preferably at least 0.5 M, and most preferably at least 1.2 M.

Moreover, it should be recognized that the particular chemical form of zinc addition to the electrolyte may vary considerably. For example, it is generally preferred that zinc is added to the electrolyte as a commercially available salt, and suitable salts include $ZnCl_2$, $ZnCO_3$, ZnAcetate, $Zn(NO_3)_2$, etc. Furthermore, and particularly where an existing electrolyte is replenished with zinc, it is contemplated that zinc may also be added as Zn-MSA salt. In still further contemplated aspects, and particularly where the battery is a primary battery, addition of zinc to the electrolyte may be partially or entirely omitted. In such configurations, it is contemplated that the zinc supply of the battery may come partially or entirely from a zinc (plated) anode.

Still further, it is contemplated that the zinc may be present in various forms so long as at least a portion of the zinc is in electric contact with the zinc-electrode in the battery. Consequently, suitable zinc sources in the battery include zinc-plated carbon electrodes, electrodes comprising or essentially consisting of zinc or a zinc alloy, or zinc granules or powder disposed in the electrolyte, which may or may no be gelled.

In yet another aspect of the inventive subject matter, it is contemplated that the electrolyte need not be limited to a particular composition. However, it is generally preferred that suitable electrolytes are aqueous acid electrolytes (ie., have a pH of less than 7.0), and it is contemplated that numerous organic and inorganic acids may be used. Particularly preferred acids include organic acids, and especially polyvinyl sulfonic acid, polyvinyl sulfuric acid, and sulfurous acid.

A further especially preferred organic acid that dissolves zinc ions at a relatively high concentration is methane sulfonic acid. With respect to the concentration of the MSA or other acid it should be appreciated that a particular concentration of MSA is not limiting to the inventive subject matter. However, a particularly preferred concentration of methane sulfonic acid is in the range of between 1M and 4M, and more preferably between 2.5M and 3.5M.

Alternative organic acids include trifluoromethane sulfonic acid ($CF_3SO_3H$), and it is further contemplated that inorganic acids such as perchloric acid ($HClO_4$), nitric acid, hydrochloric acid (HCl), or sulfuric acid ($H_2SO_4$) may also be appropriate. However, such alternative acids may impose safety concerns or exhibit less advantageous capability to dissolve high concentrations of zinc ions.

In further alternative aspects of the inventive subject matter, it is contemplated that various additives may be added to the electrolyte, wherein particularly preferred additives include zinc chelating agents and/or zinc brighteners. Thus, it is contemplated that the organic acid in suitable acid electrolytes may be partially or entirely replaced by a zinc chelating agents and/or zinc brighteners. There are numerous zinc brighteners known in the art, and it is contemplated that all of such brighteners are suitable for use herein. However, especially preferred zinc brighteners include aromatic monocarboxylic acids, aromatic aldehydes, and polyhydric alcohols having one or more ethoxylated or propoxylated hydroxyl groups.

In a still further contemplated aspect of the inventive subject matter, and especially where it is desirable to obtain a relatively high current efficiency of zinc plating during charging, it is preferred that Indium is added to the electrolyte to significantly increase the hydrogen overpotential. Addition of Indium is thought to act as a barrier to hydrogen evolution, thereby forcing zinc deposition upon charging of the battery. While addition of indium to alkaline electrolytes has been previously shown to reduce hydrogen the hydrogen overpotential, the inventors surprisingly discovered that zinc deposition in an acid electrolyte in the presence of indium ions was almost 95% efficient compared to 70-80% without indium (at less than 1% substitution of indium ions for zinc ions in the electrolyte).

Of course, it should be recognized that reduction of the hydrogen overpotential in contemplated batteries need not be limited to addition of indium to the electrolyte at a particular concentration, but various alternative elements (typically metals, most typically group 13 elements) at numerous other concentrations are also contemplated. For example, suitable elements include bismuth (Bi), tin (Sn), gallium (Ga), thallium (Tl), and various oxides, including diindium trioxide ($In_2O_3$), dibismuth trioxide ($Bi_2O_3$), tin oxide (SnO) and digallium trioxide ($Ga_2O_3$). With respect to the concentration of such metals and other hydrogen overpotential reducing compounds, it is generally preferred that the concentration is less than 5 mol % (relative to Zn), more typically less than 2 mol % (relative to Zn), and even more typically less than 1 mol % (relative to Zn). However, and especially where such elements or other compounds exhibit a relatively high solubility, concentrations of more than 5 mol % (relative to Zn) are also considered suitable.

While in some battery configurations a NAFION™ (copolymer of perfluorosulfonic acid and polytetrafluoroethylene) membrane may operate more satisfactorily than other membranes, it is generally contemplated that the exact physical and/or chemical nature of the membrane is not limiting to the inventive subject matter so long as such membranes allow $H^+$ exchange between an anode and cathode compartment in contemplated acidic electrolytes. Consequently, it should be appreciated that numerous alternative membranes other than NAFION™ are also suitable, and exemplary membranes include all known solid polymer electrolyte membranes, or similar materials.

With respect to the cathode, it is generally contemplated that all known zinc air battery cathode materials are suitable for use herein. For example, suitable cathodes include Teflon-coated catalyst containing air diffusion cathodes with a surface area of at least 100 $m^2$ per g electrode. Typical cathode materials may therefore include platinum-coated graphite or carbon. However, particularly preferred cathodes include glassy carbon or EBONEX™, which is the trade name of Magnelli phase titanium suboxide. The inventors have surprisingly discovered that glassy carbon in acidic electrolyte as a cathode material withstands charging the battery at relatively high current densities without apparent oxidative damage. Appropriate anode materials include any conductive material that allows for electroplating zinc to the anode. Consequently, suitable anode materials include various metals (e.g., titanium) coated to a conductive support, or zinc/zinc alloys.

Thus, particularly preferred batteries include secondary batteries having an acid electrolyte and in which zinc and oxygen form a redox pair, and wherein the electrolyte further comprises methane sulfonic acid in an amount effective to reduce dendrite formation. Such batteries will preferably include a separator separating an anolyte from a catholyte, wherein (a) the methane sulfonic acid is protonated in the anolyte and wherein (b) the methane sulfonic acid is deprotonated in the catholyte when the battery is charging. Still further, it is contemplated that the oxygen in such batteries is reduced on the cathode when the battery is charged, and preferred cathodes may comprise at least one of a Magnelli phase titanium suboxide and glassy carbon.

It should further be especially appreciated that contemplated batteries (in which a dendrite-forming metal and oxygen form a redox pair) will include a static catholyte and a static acidic anolyte, wherein at least one of the catholyte and the anolyte includes a dendrite-reducing acid thereby allowing use of the battery through at least 10, more typically at least 20, even more typically at least 50, and most typically at least 100 cycles at substantially unchanged battery performance. Particularly preferred dendrite-reducing acid are selected from the group consisting of methane sulfonic acid, polyvinyl sulfonic acid, polyvinyl sulfuric acid, and sulfurous acid.

In yet further alternative aspects of the inventive subject matter, it is contemplated that suitable batteries may be configured in a battery stack in which a series of battery cells are electrically coupled to each other via a bipolar electrode. The particular nature of the bipolar electrode is not limiting to the inventive subject matter, and it is generally contemplated that any material that allows for oxidation of oxygen during charging (and the reverse reaction during discharge) and plating/de-plating of zinc is suitable for use herein. However, a particularly preferred material for a bipolar electrode is glassy carbon (carbon that exhibits has no long-range order in three dimensions). The inventors surprisingly discovered that glassy carbon provides, despite operation in a highly acidic electrolyte, an excellent substrate for plating of zinc during charging.

Furthermore, glassy carbon is a relatively inexpensive and comparably light-weight material, thereby further improving the ratio of cost/weight to capacity. Further contemplated aspects of bipolar electrodes are disclosed in U.S. provisional patent application with the title "Electric Devices With Improved Bipolar Electrode" by Robert Lewis Clarke, Brian J. Dougherty, Stephen Harrison, J. Peter Millington and Samaresh Mohanta, which was filed on or about Feb. 12, 2002, which is incorporated by reference herein. Alternatively, suitable electrodes for contemplated batteries also include electrodes comprising Magnelli phase titanium suboxide, which have shown a relatively high resistance to oxidative degradation.

Particularly useful applications of the inventive subject matter presented herein include the use of contemplated electrolytes and electrodes in various battery types where a favorable power-to-weight ratio is desired. For example, contemplated batteries are thought to be particularly advantageous in automotive batteries and especially automotive traction batteries. On the other hand, contemplated electrolytes and electrodes may also be employed in primary battery types that are useful for household and other uses where a relatively small battery capacity is required.

Thus, specific embodiments and applications of improved power cells and compositions have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A secondary battery comprising an anode, a cathode, and a static acid electrolyte fluid, wherein oxygen and a dendrite-forming metal form a redox pair to provide current of the battery, wherein the electrolyte further comprises a compound at a concentration effective to provide acidity to the electrolyte and to reduce dendrite formation of the metal during charging, wherein the cathode comprises a material that allows formation of oxygen during charging, and wherein the material is at least one of a Magnelli phase titanium suboxide and glassy carbon.

2. The battery of claim 1 wherein the dendrite-forming metal is zinc.

3. The battery of claim 1 wherein the compound comprises an organic acid.

4. The battery of claim 3 wherein the compound comprises methane sulfonic acid.

5. The battery of claim 3 wherein the compound is selected from the group consisting of polyvinyl sulfonic acid, and polyvinyl sulfuric acid.

6. The battery of claim 1 further comprising a zinc brightener.

7. The battery of claim 6 wherein the zinc brightener is selected from the group consisting of an aromatic monocarboxylic acid, an aromatic aldehyde, and a polyhydric alcohol having ethoxylated or propoxylated hydroxyl groups.

8. The battery of claim 1 wherein the dendrite-forming metal forms a complex with the compound when the battery discharges.

9. The battery of claim 8 wherein the dendrite-forming metal is zinc, and wherein the compound comprises methane sulfonic acid.

10. The battery of claim 1 comprising a plurality of cells in which a bipolar electrode separates a first cell from a second cell, and in which at least one side of the bipolar electrode comprises a Magnelli phase titanium suboxide.

* * * * *